(12) United States Patent  (10) Patent No.: US 7,106,480 B2
Huang  (45) Date of Patent: Sep. 12, 2006

(54) FILM SCANNING DEVICE

(75) Inventor: Pin-Jui Huang, Taipei Hsien (TW)

(73) Assignee: Pacific Image Electronics Co., Ltd., Taipei Hsien (TW)

( * ) Notice: Subject to any disclaimer, the term of this patent is extended or adjusted under 35 U.S.C. 154(b) by 887 days.

(21) Appl. No.: 10/226,272

(22) Filed: Aug. 23, 2002

(65) Prior Publication Data

US 2004/0036928 A1  Feb. 26, 2004

(51) Int. Cl.
H04N 1/04 (2006.01)
(52) U.S. Cl. ............... 358/487; 358/475; 358/497; 358/474
(58) Field of Classification Search ............ 358/487, 358/475, 506, 509, 505, 474, 497, 494, 406, 358/504; 355/40, 41, 75, 67, 68.53, 68, 53; 399/211, 214, 378; 250/234, 235, 216, 239
See application file for complete search history.

(56) References Cited

U.S. PATENT DOCUMENTS 5,251,072 A * 10/1993 Fukuoka et al. ............ 359/896
5,381,245 A * 1/1995 Johnston et al. ............ 358/487
5,432,622 A * 7/1995 Johnston et al. ............ 358/474
5,589,952 A * 12/1996 Sato et al. .................. 358/487
6,169,611 B1 * 1/2001 Brook et al. ................ 358/487
6,195,181 B1 * 2/2001 Washizu ..................... 358/475
6,233,065 B1 * 5/2001 Lee ............................ 358/475
6,243,185 B1 * 6/2001 Lin et al. .................... 359/196

* cited by examiner

Primary Examiner—Cheukfan Lee
(74) Attorney, Agent, or Firm—Rosenberg, Klein & Lee

(57) ABSTRACT

The film scanner of the present invention basically comprises an image capture module, a media holder, and a screw drive. The image capture module comprises a pressure guide, a reflector, a lens, and an image sensor. A pressure guide with a window through which an image of the media is captured by the image sensor, and the reflector, lens, and the image sensor are all mounted in the same housing to remain in a fixed position relative to each other. In order to maintain good contact between the media holder and the pressure guide, an arm tension scheme is utilized. Since a force pushes the pressure guide down onto the media holder, the resultant scanned image is of high quality. In one embodiment, the media holder is a removable magazine allowing for a wide variety of media to be scanned.

21 Claims, 6 Drawing Sheets

FILM SCANNING DEVICE

BACKGROUND OF THE INVENTION

1. Field of the Invention

The present invention relates to a scanner. More specifically, the present invention discloses a film scanner with integrated image sensor module for scanning images from film, negatives, or filmstrips.

2. Description of the Prior Art

Scanners are widely used in the field of graphic design, image processing, and photography. The convention flatbed scanner uses a scanning bed which is typically a piece of glass upon which the image or document to be scanned is placed. This type of scanner, while useful for some applications, can typically only offer a resolution of about 300 dpi. Obviously, for fine detail or professional results, a higher resolution is required.

In addition, conventional scanners require very precise dimensions for all component parts. This is due to the fact that the internal mounting components are used to control the positioning of the various image processing elements of the scanner. If any dimensions of the components used are out of tolerance, the setup or calibration of the unit will be hindered and the scan quality will be adversely affected. Therefore, the overall quality of the scanned image will suffer. Because of the precision required, the various mounting components are relatively expensive thus driving up the unit cost of the conventional scanner.

Furthermore, the image processing components of conventional scanners use multiple components that are not fixed in an relative position to each other. Therefore, these types of scanners can easily get out of alignment and require frequent calibration. Any time the position between the image processing components varies, the image quality of the scanned image will be degraded.

Therefore, there is a need for an improved scanner with an integrated image sensor and capture module that provides a high resolution and high quality scanned image while being relatively inexpensive to produce and easy to maintain.

SUMMARY OF THE INVENTION

To achieve these and other advantages and in order to overcome the disadvantages of the conventional method in accordance with the purpose of the invention as embodied and broadly described herein, the present invention provides an improved film scanner with an integrated image capture module for scanning film, negatives, filmstrips, slides or other types of semi-transparent media.

The film scanner of the present invention basically comprises an image capture module, a media holder, and a screw drive. The image capture module comprises a pressure guide, a reflector, a lens, and an image sensor. The pressure guide acts as a tracking guide which moves over a media holder holding the media to be scanned. The pressure guide has an window through which the media can be captured by the image sensor. The reflector is, for example, a mirror or other type of reflective surface. The lens allows the reflected image of the scanned media to be focused correctly for the image sensor. The lens may enlarge or reduce the scanned image as required or desired. The image sensor is, for example, a Complementary Metal-Oxide Semiconductor (CMOS) image sensor, a Charge Coupled Device (CCD) camera, or other type of image sensor that is capable of accurately capturing the reflected scanned image. Note that the reflector, the lens, and the image sensor are all mounted in the same housing. Therefore, once assembled during production, these key image capturing components will remain in a fixed position relative to each other.

An advantage of the present invention is that all of the image capturing components of the scanner are mounted in a fixed position to each other. Therefore, there is little chance that the film scanner of the present invention will go out of calibration. Thus the present invention proves high resolution and excellent quality scanned images while be easy to maintain.

In order to maintain good contact between the media holder and the pressure guide, an arm tension scheme is utilized. The image capture module is in contact with a fulcrum. A tension device, for example a wire spring, or bent metal strip, provides proper tension to push the rear end of the image capture module up. Therefore, a force pushes the pressure guide down onto the media holder. Since there is a pressure applied, the resultant scanned image is of high quality.

An advantage of the present invention is that since a tension scheme is utilized, the image capture module remains in contact with the media holder so that a high quality scanned image can be achieved. Without this tension scheme, the relative position between the media and the reflector would change resulting in a poorly focused scanned image.

Note that image capture module may be mounted or attached to the fulcrum by means of, for example, a clip, pin, bolt, screw or other attaching device, so that the image capture module may rock or see-saw on the fulcrum depending on the tension applied by the tension device. In other embodiments of the present invention, the position of the tension device can be changed. For example, the fulcrum can be positioned towards the rear of the image capture module and the tension device is positioned between the pressure guide and the fulcrum. This arm tension scheme provides the same functionality as the scheme described above. In another scheme, the tension device and the fulcrum are positioned above the image capture module. This arm tension scheme also provides the same functionality as the other schemes mentioned. Other types of arm tension schemes are utilized in various embodiments of the present invention. Whether the tension device provides a pushing or pulling tension, the end result of providing a force that pushes the pressure guide into constant contact with the media holder is achieved. Thereby, a high quality scanned image can be obtained.

A light source is attached to an arm comprising threaded mounts. The threaded mounts ride on a threaded screw mechanism. As a motor turns the threaded screw mechanism through the threaded mounts, the arm holding the light source is moved forward or backward. The fulcrum and tension device in the arm tension schemes as described above, are attached to a plate of the arm holding the light source. Since the arm tension scheme is attached to both the image capture module and the arm holding the light source, the two sections are held in alignment together. Therefore, as the media is scanned, the light source and the window are maintained in correct positioning with each other and a high quality scan is obtained. Note that in this embodiment the threaded mounts are attached to the arm or plate. However, in other embodiments of the present invention, the threaded mounts are not fixedly attached to the arm or plate.

In an embodiment of the present invention, the threaded screw mechanism turns through a single threaded mount. The threaded mount is not fixedly attached to the plate or arm holding the light source but is flexibly attached. The threaded mount comprises an arm which penetrates an opening in the plate or arm holding the light source. In this way, since the threaded mount is not fixed to the plate, the arm holding the light source may move up or down but will still be moved forward or backward by the threaded screw mechanism. Since the image capture module and the arm holding the light source are connected, any movement required by the pressure guide to maintain contact with the media holder will allow the arm holding the light source to move also. Therefore, correct positioning and alignment between the image capture module and the light source is maintained.

The media holder further comprises a media seat. The media to be scanned is placed between the media holder and the media seat. After the media is placed, the media holder is locked closed. Therefore, the media will not move or shift while being scanned. In an embodiment of the present invention, the media holder is attached to the media seat by means of a hinge. This allows the media holder to be opened and closed easily. However, in other embodiments of the present invention, the media holder and the media seat are combined into a magazine type cartridge. Therefore, special size media can easily be scanned regardless of their size or unique shape. Alternatively, the media holder is not fixedly attached by a hinge to the media seat but snaps into position as required. The media holder sits on top of the media to be scanned and holds it firmly so that the media does not shift or move during scanning. The pressure guide rides on top of the media holder during scanning. As disclosed above, the arm tension scheme provides a proper force needed to ensure a pressure is applied pushing the pressure guide down onto the media holder so that the focus does not change during scanning.

The Focus Depth is the correct position where the media to be scanned should be positioned for proper focussing during scanning. It is important the the media is still located in the Focus Depth range. Note that since both the media holder and the media seat may be spring loaded and capable of flexibly handling some altering of positioning without losing focus. Note that even in these conditions, the media should still be positioned within the Focus Depth. In situations, for example when using a slide, where the film media is mounted in a housing, the media holder is positioned on top of the housing of the media. For this condition the relationship of the distances is given as F2–F4=F3. In this way, the media holder height can be correctly determined in order to provide proper focusing during scanning. As described above, the media holder can be modified to allow use of a wide type of media to be scanned by the film scanner.

A scan button is located on the film scanner to activate scanning. Once the button is pressed, the motor driving the threaded screw mechanism begins and the threaded screw turns. As the threaded screw turns, the threaded mount moves forward, thus driving the arm with the light source and the image capture module forward. The light source will illuminate the underside of the media to be scanned being held in the film holder. Since the media to be scanned is transparent or semi-transparent, the image of the media will pass through the window in the pressure guide and be reflected off of the reflective surface. This reflected image will then be passed through the lens and finally be captured by the image sensor. Electronic devices in the film scanner will then store or process the captured image. Once the scan has been completed, the motor reverses and draws, via the threaded screw, the arm with the light source and the image capture module back to the standby position. In the standby position, the pressure guide will be resting on the end of the media seat. The captured image can then be transferred to a computer by means of a connecting cable, for example, a USB or IE1394 cable. The user is then free to manipulate or further process the captured image as required within the computer.

As disclosed above, the penetrating film scanning device of the present invention provides an image capture module comprising a reflective surface, a lense, and a camera. Since these key image capture elements are mounted in the same housing, the scanning device will stay in calibration and provide high resolution, high quality scans with a longer lifetime.

Additionally, since the arm holding the light source is attached to the image capture module, the positioning relationship of the light source is correctly positioned in relation to the pressure guide window and reflector during scanning. Thus a higher quality of scanned image is achieved.

Also, since the arm is flexibly attached to the threaded mount, the image capture module and arm are allowed movement to correct adjust to any media in the media holder. Thus allowing proper focusing of the medium.

In addition, the media holder can be a removable magazine or cartridge allowing for a wide variety of media, shapes, sizes, and media frames. In this way, media such as film, filmstrips, slides, and other transparent or transparent media, can be effectively scanned by the scanning device.

Furthermore, since the scanning device comprises a tension device, the pressure guide maintains a force pushing the pressure guide onto the media holder thus ensuring proper focusing during scanning.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 2-1 is a drawing illustrating an arm tension section of a film scanner according to an embodiment of the present invention;

FIG. 3-1 is a drawing illustrating a media holder and focus details of a film scanner according to an embodiment of the present invention;

FIG. 3-2 is a drawing illustrating a media holder and fucus details of a film scanner according to an embodiment of the present invention;

FIG. 3-3 is a drawing illustrating a media holder and fucus details of a film scanner according to an embodiment of the present invention;

FIG. 6-1 is a drawing illustrating an arm tension section of a film scanner according to an embodiment of the present invention; and FIG. 6-2 is a drawing illustrating an arm tension section of a film scanner according to an embodiment of the present invention.

DESCRIPTION OF THE PREFERRED EMBODIMENTS

Figure 1:
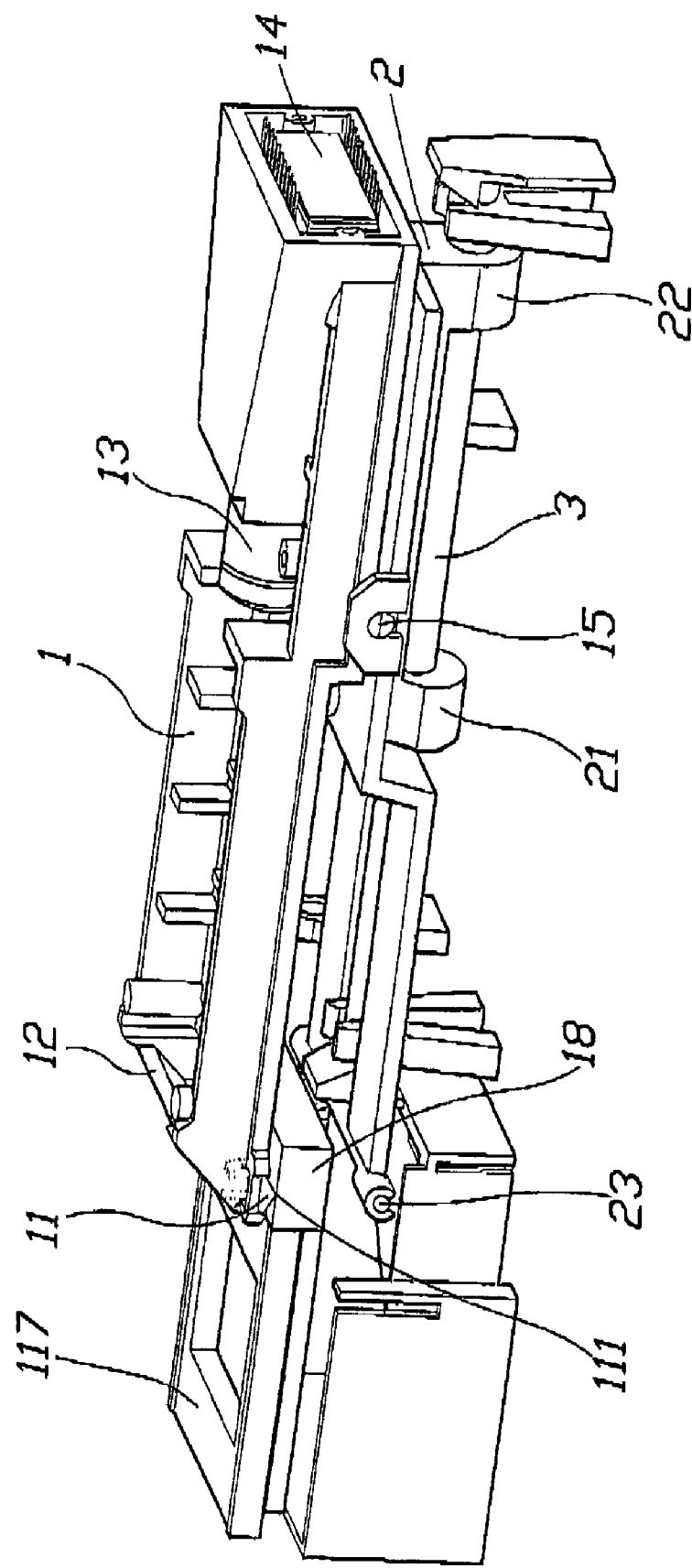
FIG. 1 is a drawing illustrating a film scanner with reflector, lens, and image sensor module according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 2:
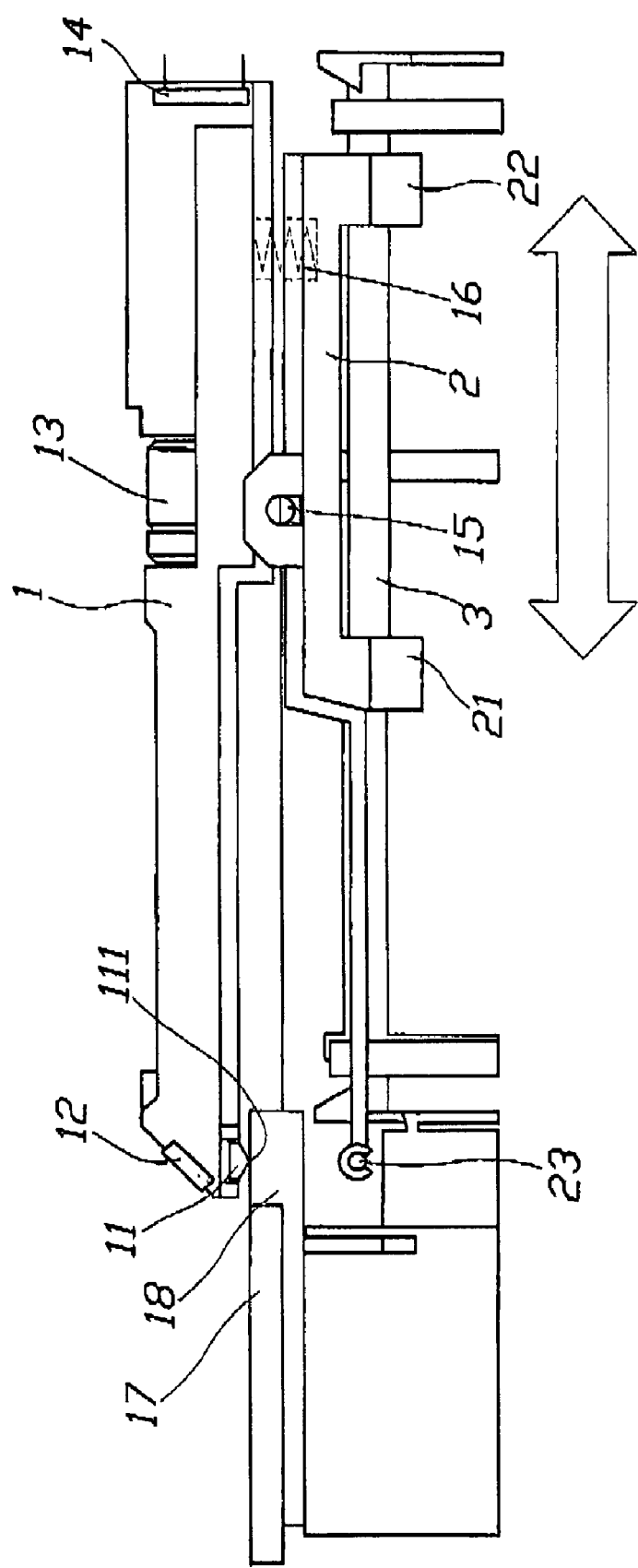
FIG. 2 is a drawing illustrating a film scanner with reflector, lens, and image sensor module according to an embodiment of the present invention.
Figures 1, 2:
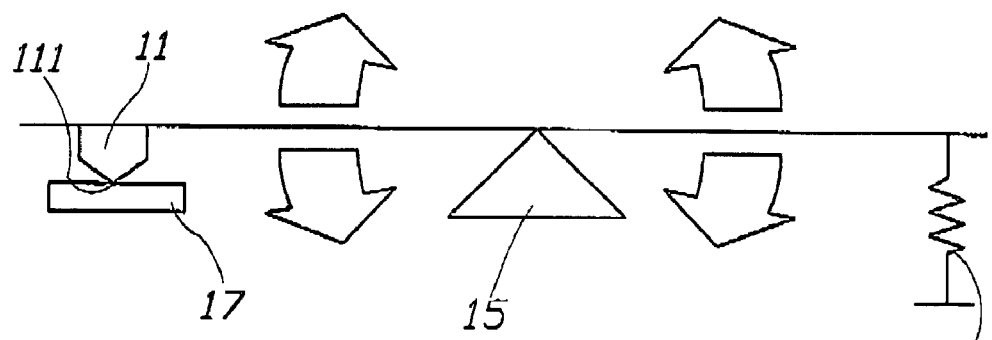

Refer to FIGS. 1 and 2, which are drawings illustrating a film scanner with image capture module according to an embodiment of the present invention.

The film scanner of the present invention basically comprises an image capture module 1, a media holder 17, and a screw drive 3.

The image capture module 1 comprises a pressure guide 11, a reflector 12, a lens 13, and an image sensor 14.

The pressure guide 11 acts as a tracking guide which moves over a media holder 17 holding the media to be scanned. The pressure guide 11 has an window 111 through which the media can be captured by the image sensor 14.

The reflector 12 is, for example, a mirror or other type of reflective surface. The lens 13 allows the reflected image of the scanned media to be focused correctly for the image sensor 14. The lens 13 may enlarge or reduce the scanned image as required or desired. The image sensor 14 is, for example, a Complementary Metal-Oxide Semiconductor (CMOS) image sensor, a Charge Coupled Device (CCD) camera, or other type of image sensor that is capable of accurately capturing the reflected scanned image.

Note that the reflector 12, the lens 13, and the image sensor 14 are all mounted in the same housing. Therefore, once assembled during production, these key image capturing components will remain in a fixed position relative to each other.

An advantage of the present invention is that all of the image capturing components of the scanner are mounted in a fixed position to each other. Therefore, there is little chance that the film scanner of the present invention will go out of alignment. Thus the present invention proves high resolution and excellent quality scanned images while be easy to maintain.

Refer now to FIG. 2-1, which is a drawing illustrating an arm tension section of a film scanner according to an embodiment of the present invention.

In order to maintain good contact between the media holder 17 and the pressure guide 11, an arm tension scheme is utilized. The image capture module 1 is in contact with a fulcrum 15. A tension device 16, for example a wire spring, or bent metal strip, provides proper tension to push the rear end of the image capture module up. Therefore, a force pushes the pressure guide 11 down onto the media holder 17. Since there is a pressure applied, the resultant scanned image is of high quality.

An advantage of the present invention is that since a tension scheme is utilized, the image capture module 1 remains in contact with the media holder 17 so that a high quality scanned image can be achieved. Without this tension scheme, the relative position between the media and the reflector would change resulting in a poorly focused scanned image.

Note that image capture module 1 may be mounted or attached to the fulcrum 15 by means of, for example, a clip, pin, bolt, screw or other attaching device, so that the image capture module 1 may rock or see-saw on the fulcrum depending on the tension applied by the tension device 16.

FIG. 2-1 shows one type of arm tensioning scheme. In other embodiments of the present invention, the position of the tension device 16 can be changed. For example, refer to FIG. 6-1, which is a drawing illustrating an arm tension section of a film scanner according to an embodiment of the present invention.

Figures 1, 6:
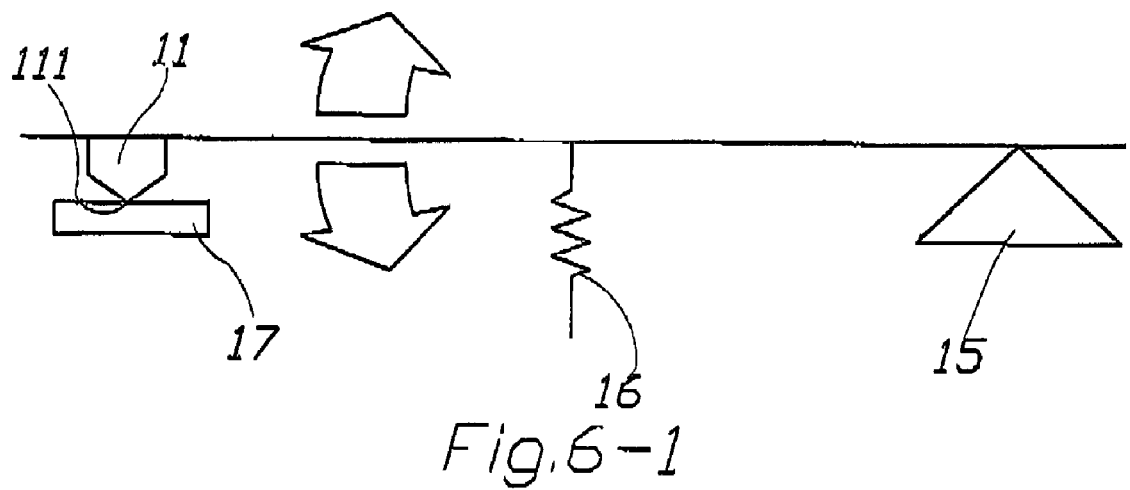
Figures 2, 6:
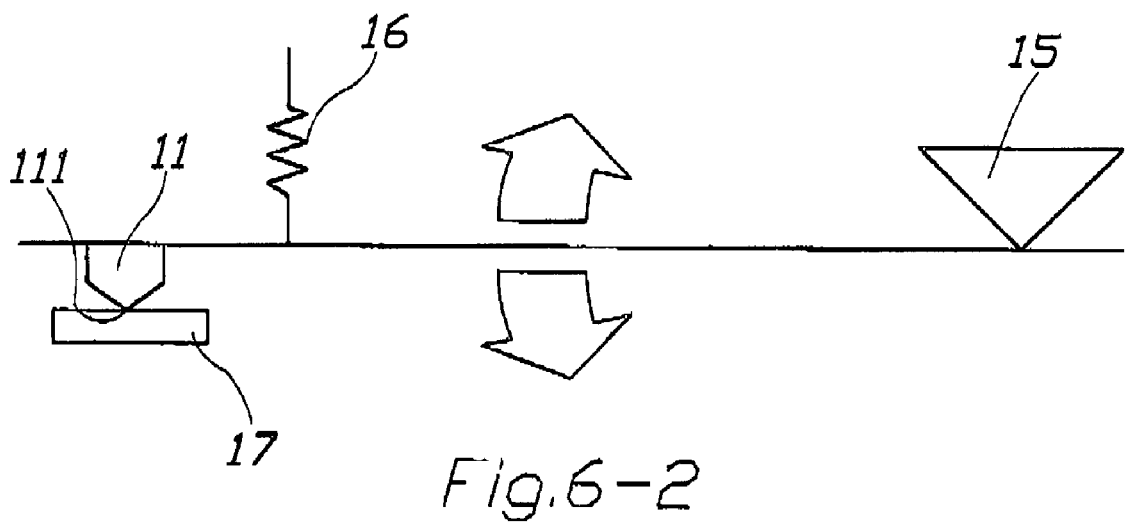

In FIG. 6-1, the fulcrum 15 is positioned towards the rear of the image capture module and the tension device 16 is positioned between the pressure guide 11 and the fulcrum 15. This arm tension scheme provides the same functionality as the scheme described above.

Additionally, refer to FIG. 6-2, which is a drawing illustrating an arm tension section of a film scanner according to an embodiment of the present invention. In this scheme, the tension device 16 and the fulcrum 15 are positioned above the image capture module. This arm tension scheme also provides the same functionality as the other schemes mentioned.

Other types of arm tension schemes are utilized in various embodiments of the present invention. Whether the tension device 16 provides a pushing or pulling tension, the end result of providing a force that pushes the pressure guide into constant contact with the media holder is achieved. Thereby, a high quality scanned image can be obtained.

Referring back to FIGS. 1 and 2, a light source 23 is attached to an arm comprising threaded mounts 21, 22. The threaded mounts 21, 22 ride on a threaded screw mechanism 3. As a motor turns the threaded screw mechanism 3 through the threaded mounts 21, 22, the arm holding the light source 23 is moved forward or backward. The fulcrum 15 and tension device 16 in the arm tension schemes as described above, are attached to a plate 2 of the arm holding the light source 23.

Since the arm tension scheme is attached to both the image capture module 1 and the arm holding the light source 23, the two sections are held in alignment together. Therefore, as the media is scanned, the light source 23 and the window 111 are maintained in correct positioning with each other and a high quality scan is obtained.

Note that in this embodiment the threaded mounts 21, 22 are attached to the arm or plate 2. However, in other embodiments of the present invention, the threaded mounts 21, 22 are not fixedly attached to the arm or plate 2.

Figure 7:
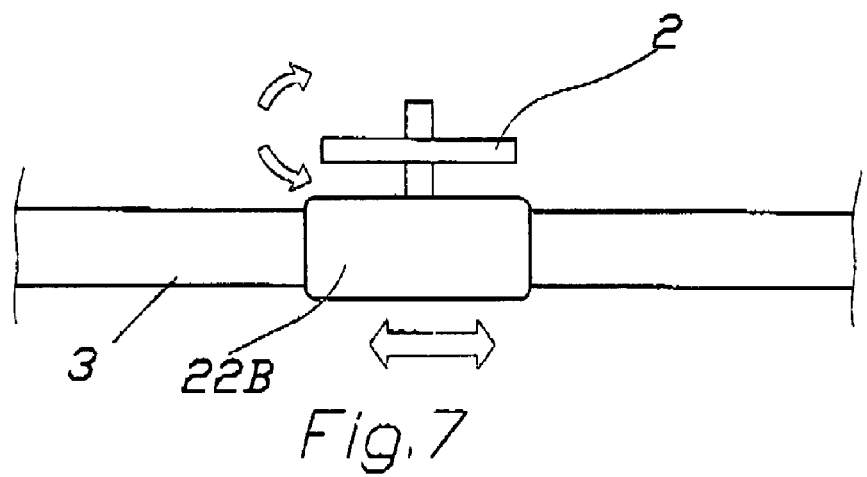
FIG. 7 is a drawing illustrating a screw drive and mount assembly according to an embodiment of the present invention.

Refer to FIG. 7, which is a drawing illustrating a screw drive and mount assembly according to an embodiment of the present invention. In this embodiment, the threaded screw mechanism 3 turns through a single threaded mount 22B. The threaded mount 22B is not fixedly attached to the plate 2 or arm holding the light source. The threaded mount 22B comprises an arm which penetrates an opening in the plate 2 or arm holding the light source.

In this way, since the threaded mount 22B is not fixed to the plate 2, the arm holding the light source may move up or down but will still be moved forward or backward by the threaded screw mechanism 3. Since the image capture module and the arm holding the light source are connected, any movement required by the pressure guide to maintain contact with the media holder will allow the arm holding the light source to move also. Therefore, correct positioning and alignment between the image capture module and the light source is maintained.

Referring back to FIGS. 1 and 2. The media holder 17 further comprises a media seat 18. The media to be scanned is placed between the media holder 17 and the media seat 18. After the media is placed, the media holder 17 is locked closed. Therefore, the media will not move or shift while being scanned.

In an embodiment of the present invention, the media holder 17 is attached to the media seat 18 by means of a hinge. This allows the media holder 17 to be opened and closed easily. However, in other embodiments of the present invention, the media holder 17 and the media seat 18 are combined into a magazine type cartridge. Therefore, special size media can easily be scanned regardless of their size or unique shape. Alternatively, the media holder 17 is not fixedly attached by a hinge to the media seat 18 but snaps into position as required.

Refer to FIGS. 3-1, 3-2, 3-3, 4, and 5, which are drawings illustrating a media holder and focus details of a film scanner according to an embodiment of the present invention.

The media holder 17 sits on top of the media to be scanned and holds it firmly so that the media does not shift or move during scanning. The pressure guide 1 rides on top of the media holder 17 during scanning. As disclosed above, the arm tension scheme provides a proper force needed to ensure a pressure is applied pushing the pressure guide 11 down onto the media holder 17 so that the focus does not change during scanning.

The Focus Depth FD is the correct position where the media F to be scanned should be positioned for proper focussing during scanning. L1 is the distance between the media F to be scanned and the reflecting surface 12. L2 is the height of the media holder 17.

Figures 1, 3:
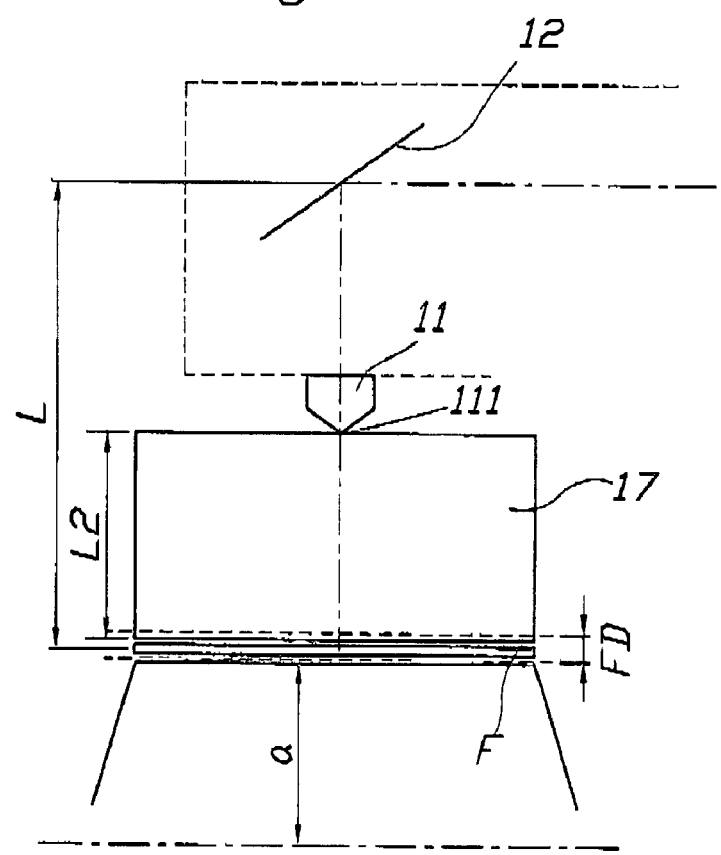
Figures 2, 3:
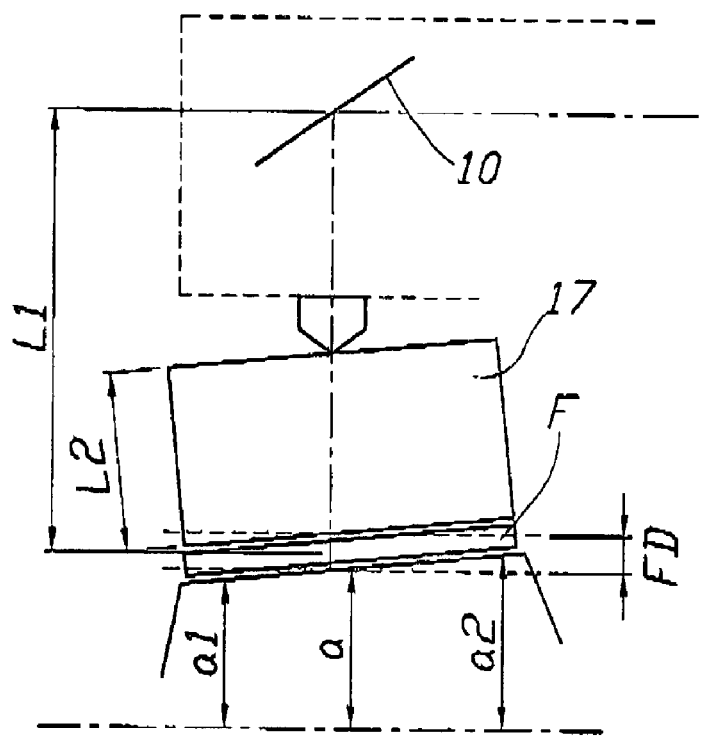
Figure 3:
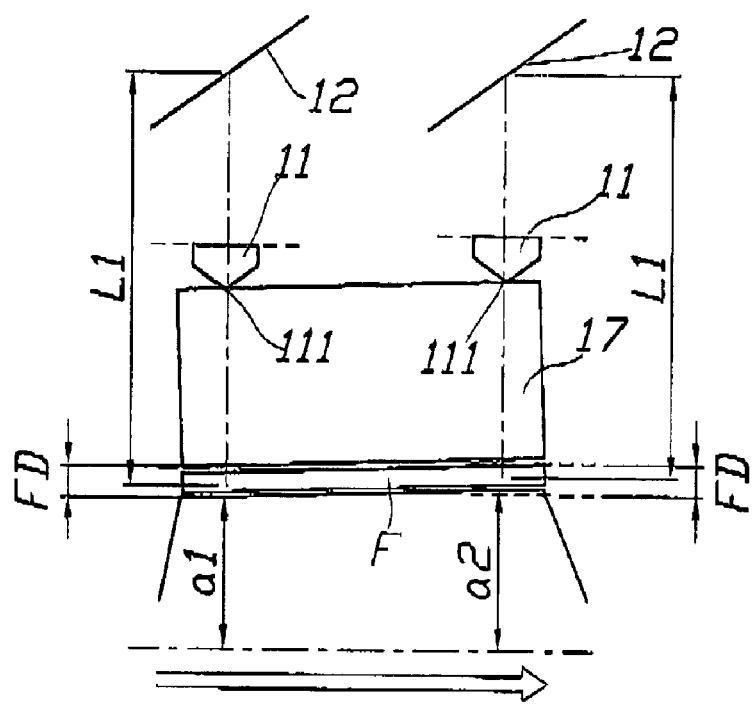
Figure 4:
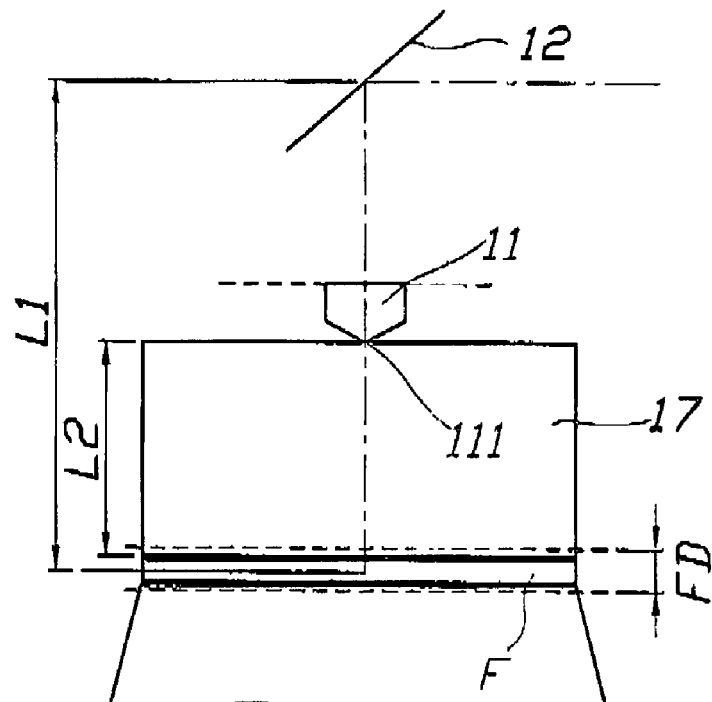
FIG. 4 is a drawing illustrating a media holder and fucus details of a film scanner according to an embodiment of the present invention.

Refer to FIGS. 3-2 and 3-3 which illustrate conditions where the media F and the media holder 17 are not perpendicular to the reflecting plane. In this condition, it is important the the media F is still located in the Focus Depth FD range.

Note that since both the media holder 17 and the media seat 18 may be spring loaded and capable of flexibly handling some altering of positioning without losing focus. Note that even in these conditions, the media F should still be positioned within the Focus Depth FD.

Figure 5:
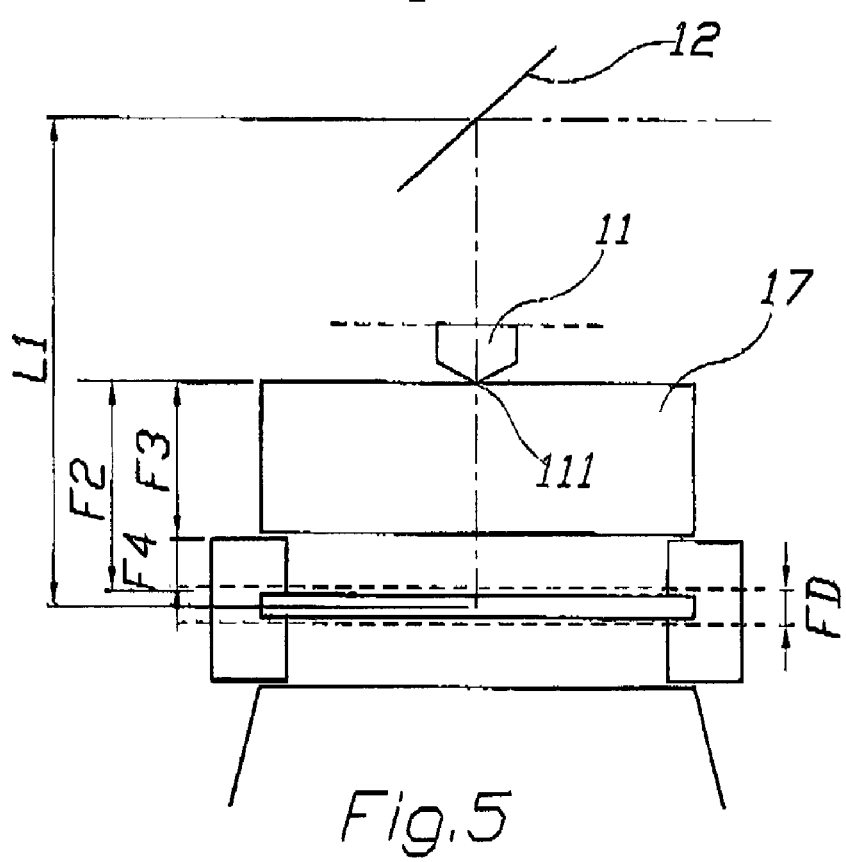
FIG. 5 is a drawing illustrating a media holder and fucus details of a film scanner according to an embodiment of the present invention.

Refer to FIG. 5 which illustrates use of a media, for example a slide, where the film media is mounted in a housing. In this condition, the media holder 17 is positioned on top of the housing of the media. For this condition the relationship of the distances is given as F2−F4=F3. In this way, the media holder height can be correctly determined in order to provide proper focusing during scanning.

As described above, the media holder 17 can be modified to allow use of a wide type of media to be scanned by the film scanner.

A scan button is located on the film scanner to activate scanning. Once the button is pressed, the motor driving the threaded screw mechanism begins and the threaded screw turns. As the threaded screw turns, the threaded mount moves forward, thus driving the arm with the light source and the image capture module forward.

The light source will illuminate the underside of the media to be scanned being held in the film holder. Since the media to be scanned is transparent or semi-transparent, the image of the media will pass through the window in the pressure guide and be reflected off of the reflective surface. This reflected image will then be passed through the lens and finally be captured by the image sensor. Electronic devices in the film scanner will then store or process the captured image.

Once the scan has been completed, the motor reverses and draws, via the threaded screw, the arm with the light source and the image capture module back to the standby position. In the standby position, the pressure guide will be resting on the end of the media seat.

The captured image can then be transferred to a computer by means of a connecting cable, for example, a USB or IE1394 cable.

The user is then free to manipulate or further process the captured image as required within the computer.

As disclosed above, the penetrating film scanning device of the present invention provides an image capture module comprising a reflective surface, a lense, and a camera. Since these key image capture elements are mounted in the same housing, the scanning device will stay in calibration and provide high resolution, high quality scans with a longer lifetime.

Additionally, since the arm holding the light source is attached to the image capture module, the positioning relationship of the light source is correctly positioned in relation to the pressure guide window and reflector during scanning. Thus a higher quality of scanned image is achieved.

Also, since the arm is flexibly attached to the threaded mount, the image capture module and arm are allowed movement to correct adjust to any media in the media holder. Thus allowing proper focusing of the medium.

In addition, the media holder can be a removable magazine or cartridge allowing for a wide variety of media, shapes, sizes, and media frames. In this way, media such as film, filmstrips, slides, and other transparent or transparent media, can be effectively scanned by the scanning device.

Furthermore, since the scanning device comprises a tension device, the pressure guide maintains a force pushing the pressure guide onto the media holder thus ensuring proper focusing during scanning.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A scanning device comprising:
   a media holder for holding a medium to be scanned;
   an image capture module comprising:
      a reflecting surface, for reflecting an image of the medium;
      a pressure guide, for providing a pressure surface so that the image capture module maintains proper focusing during scanning, the pressure guide further comprising:
         a window, through which the image from the medium passes to the reflecting surface;
      a lens, through which the image reflected by the reflecting surface passes; and an image sensor, for capturing the image reflected by the reflecting surface and passed through the lens;

an arm, attached to the image capture module,
wherein the arm is attached to the image capture module by means of an arm tension device comprising:
a fulcrum to which the image capture module is attached and allowing rocking of the image capture module; and
a tension mechanism which provides a pressure on an end of the image capture module, pushing the pressure guide onto the media holder;

a light source attached to the arm, for providing a light to penetrate the medium during scanning;

a threaded screw mechanism, for providing a drive force for the image capture module and arm; and a threaded mount, attached to the arm and threaded onto the treaded screw mechanism so that when the threaded screw mechanism turns, the threaded mount moves accordingly so as to move the image capture module and arm forward and backward during operation.

2. The scanning device of claim 1, wherein the threaded mount is flexibly attached to the arm so that the image capture module and arm are movable during scanning to accommodate the medium and maintain proper focus.

3. The scanning device of claim 2, wherein the pressure guide moves across the media holder during scanning and returns to rest on the media seat after scanning.

4. The scanning device of claim 1, wherein the scanning device further comprises a media seat on which the media is placed, attached to the media holder so that the media is held firmly between the media seat and media holder.

5. The scanning device of claim 4, wherein both the media seat and the media holder further comprise flexible media mounting surfaces so that the media mounting surfaces adjust according to a shape or size of the medium to be scanned.

6. The scanning device of claim 1, wherein the reflecting surface is a mirror.

7. The scanning device of claim 1, wherein the tension device is a spring.

8. The scanning device of claim 1, wherein the tension device is a spring clip.

9. The scanning device of claim 1, wherein the image sensor is a Complementary Metal-Oxide Semiconductor (CMOS) image sensor.

10. The scanning device of claim 1, wherein the image sensor is a Charge Coupled Device (CCD) camera.

11. The scanning device of claim 1, wherein the media holder is a removable magazine for holding media of a wide variety of media types, shapes, and sizes.

12. A scanning device comprising:
a media holder for holding a medium to be scanned;
an image capture module comprising:
a reflecting surface, for reflecting an image of the medium;
a pressure guide, for providing a pressure surface so that the image capture module maintains proper focusing during scanning, the pressure guide further comprising:
a window, through which the image from the medium passes to the reflecting surface;
a lens, through which the image reflected by the reflecting surface passes; and
an image sensor, for capturing the image reflected by the reflecting surface and passed through the lens;

an arm, attached to the image capture module;

a light source attached to the arm, for providing a light to penetrate the medium during scanning;

a threaded screw mechanism, for providing a drive force for the image capture module and arm; and a threaded mount, attached to the arm and threaded onto the threaded screw mechanism so that when the threaded screw mechanism turns, the threaded mount moves accordingly so as to move the image capture module and arm forward and backward during operation.

13. The scanning device of claim 12, wherein the threaded mount is flexibly attached to the arm so that the image capture module and arm is movable during scanning to accommodate the medium and maintain proper focus.

14. The scanning device of claim 12, wherein the scanning device further comprises a media seat on which the media is placed, attached to the media holder so that the media is held firmly between the media seat and media holder.

15. The scanning device of claim 14, wherein both the media seat and the media holder further comprise flexible media mounting surfaces so that the media mounting surfaces adjust according to a shape or size of the medium to be scanned.

16. The scanning device of claim 12, wherein the pressure guide moves across the media holder during scanning and returns to rest on the media seat after scanning.

17. The scanning device of claim 12, wherein the reflecting surface is a mirror.

18. The scanning device of claim 12, wherein the image sensor is a Complementary Metal-Oxide Semiconductor (CMOS) image sensor.

19. The scanning device of claim 12, wherein the image sensor is a Charge Coupled Device (CCD) camera.

20. The scanning device of claim 12, wherein the media holder is a removable magazine for holding media of a wide variety of media types, shapes, and sizes.

21. The scanning device of claim 12, wherein the arm is attached to the image capture module by means of a tension mechanism so that a force is applied to the image capture module so as to maintain pressure on the pressure guide during scanning.

* * * * *